United States Patent [19]

Zuraw

[11] Patent Number: 5,166,245
[45] Date of Patent: Nov. 24, 1992

[54] MODIFIED ROSIN RESINS FOR WATER-BASED INKS

[75] Inventor: Paul J. Zuraw, Mt. Pleasant, S.C.

[73] Assignee: Westvaco Corporation, New York, N.Y.

[21] Appl. No.: 790,757

[22] Filed: Nov. 12, 1991

Related U.S. Application Data

[63] Continuation-in-part of Ser. No. 681,919, Apr. 8, 1991, abandoned.

[51] Int. Cl.$^5$ .............................................. C08J 0/00
[52] U.S. Cl. ................................... 524/270; 524/502; 524/576; 525/54.44
[58] Field of Search ............... 524/270, 271, 502, 576; 525/54.44

[56] References Cited

U.S. PATENT DOCUMENTS

| | | | |
|---|---|---|---|
| 2,940,946 | 6/1960 | Shokal et al. | 260/23 |
| 2,994,635 | 8/1961 | Reaville et al. | 162/179 |
| 3,929,701 | 12/1975 | Hall et al. | 260/23 |
| 4,169,821 | 10/1979 | Werner et al. | 525/54.44 |
| 4,535,013 | 8/1985 | Kuhn | 524/270 X |
| 4,552,592 | 11/1985 | Rudolphy et al. | 525/54.44 X |
| 4,622,357 | 11/1986 | Tsuchida et al. | 525/54.44 X |
| 4,648,905 | 3/1987 | Peck et al. | 524/270 X |
| 4,973,617 | 11/1990 | Incontro et al. | 524/270 X |
| 4,980,408 | 12/1990 | Chan | 525/54.44 X |
| 4,988,123 | 1/1991 | Lin et al. | 524/270 X |
| 5,019,622 | 5/1991 | Burke et al. | 525/54.44 X |
| 5,026,753 | 6/1991 | West et al. | 524/270 X |
| 5,026,754 | 6/1991 | Pavlin et al. | 524/270 X |

*Primary Examiner*—Joseph L. Schofer
*Assistant Examiner*—J. M. Reddick
*Attorney, Agent, or Firm*—Daniel B. Reece, IV; Terry B. McDaniel; Richard L. Schmalz

[57] ABSTRACT

The invention is ink pigment grinding resins for water-based printing inks which are produced by the esterification of fortified rosin with styrene-allyl alcohol copolymer and various polyols. The resulting rosin resin may be employed over a wide range of pH values to produce stable low viscosity grind bases.

15 Claims, No Drawings

MODIFIED ROSIN RESINS FOR WATER-BASED INKS

FIELD OF INVENTION

This application is a continuation-in-part of my commonly assigned, co-pending U.S. Pat. application Ser. No. 07/681,919 filed Apr. 8, 1991, now abandoned entitled "Modified Rosin Resins for Water-Based Inks".

FIELD OF THE INVENTION

This invention relates to novel compositions of matter for ink pigment grinding resins and the process for preparing them. In particular, the invention relates to novel grinding resins which produce over a broad range of pH values stable, low viscosity, high solids grind bases and water-based ink formulations.

BACKGROUND OF THE INVENTION

Impelled by environmental concerns and increasing governmental regulations on the volatile organic content of coatings, the applications of water-based flexographic and rotogravure inks are increasing in the ink industry. A typical water-based ink system is formulated by the addition of a binder resin (usually acrylic polymer latices) to a grind base. Grind bases are prepared by using grinding resins to disperse pigments. Pigments are crystalline solids composed of agglomerates, aggregates, and primary particles which vary in size from 0.02 to 0.5 microns. During the grinding process, agglomerates and aggregates are broken down into primary particles which possess strong tendencies to reassociate in an ink. The finer the particle size of the pigment, the greater the color strength, but the more difficult the pigment becomes to disperse. Grinding resins help prevent the particles from reassociating by increasing both the electrostatic and steric repulsion between pigment particles.

An ink formulator must consider the compatibility of the various ink components when selecting the grind resins to be used. Grind bases (i.e., pigment dispersions) are let down with a variety of alkali-soluble resins or alkali-insoluble resin emulsions to achieve the properties desired for the end use of the ink. If the grind resins and the let-down resins are not compatible, the result may be pigment flocculation, viscosity increase, loss of color strength, and other problems.

Currently, the rosin resins UNIREZ® 7098 (manufactured by Union Camp Corporation) and FILTREZ® 5014 (manufactured by Filtered Rosin Products Corporation) are pre-eminent in the alkali-soluble grind resin market. These resins are unique in their ability to produce stable, low viscosity, high solids grind bases and inks for water-based flexographic printing. (As used herein the term "high solids" means containing over 20% solids.) UNIREZ 7098 and FILTREZ 5014 have high softening points (130–140° C.), produce excellent color development when grinding pigment, and contribute to the toughness and water resistance of the finished ink. However, both the viscosity and the stability of grind bases and inks produced from UNIREZ 7098 or FILTREZ 5014 are highly pH dependent. As grind bases must remain stable and fluid to be applicable, this pH dependence has remained a problem associated with the use of these resins.

At the present time, most water-based printing inks are produced at pH values between 8 and 10. It would be advantageous to ink formulators to have a resin which is stable over this entire range. Therefore, it is the object of this invention to have an alkali-soluble resin which may be used to prepare stable, low viscosity pigment dispersions over a wide range of pH values while maintaining excellent physical properties in the finished inks.

SUMMARY OF THE INVENTION

The object of this invention is met by the development of aqueous dispersing resins (i.e., grinding resins) with improved properties which may be employed over a wide range of pH values. The resins are produced from rosin fortified with maleic anhydride or fumaric acid, followed by esterification with styrene-allyl alcohol (SAA) copolymer and a polyol or combination of polyols. As the grinding resin disperses pigment and influences ink rheology, it is a major component in most aqueous ink formulations. Efficient dispersion of the pigment (which is the most expensive component of ink) produces maximum color strength and prevents settling and flocculation. This in turn influences grinding efficiency, transfer, and printability.

As mentioned, the invention is directed to ink pigment grinding resins and the process for preparing them. In addition, the invention is also directed to ink vehicles and inks containing such resins.

DESCRIPTION OF THE PREFERRED EMBODIMENT

The invention resin is produced by the fortification of rosin followed by esterification with SAA and a polyol or combination of polyols. More particularly, the preferred fortified rosin is subsequently crosslinked with styrene-allyl alcohol copolymer (SAA), glycerol, and polyols to yield the resin.

Rosins which are suitable for use in the reaction include, but are not limited to, the following:
  wood rosin,
  tall oil rosin, and
  gum rosin.

Tall oil rosin is preferred, more preferably, fortified tall oil rosin made by reacting or mixing with the rosins varying amounts of fumaric acid, maleic anhydride, or maleic acid in the presence of a catalyst. Fortification of rosin is well known in the art, as evidenced by U.S. Pat. No. 2,994,635, which is hereby incorporated by reference.

Styrene-allyl alcohol copolymer (SAA) is a hard (softening point of 95–110° C.) thermoplastic, low molecular weight polymer available from the Monsanto Company. SAA may be prepared in a variety of ways (e.g., see U.S. Pat. No. 2,940,946, which is hereby incorporated be reference). It is soluble in alcohols, esters, ketones, aromatic and hydrocarbon solvents, but SAA is not water soluble and must, therefore, be esterified with fortified rosin to attain alkali solubility. Traditionally, SAA has been used in solvent-based systems to improve the gloss and the chemical resistance of paints, inks, and overprint varnishes.

Only small differences exist between the two types of SAA produced by Monsanto: RJ-100 (which has a molecular weight of 2340) and RJ-101 (which has a molecular weight of 1700). While either type of SAA may be used to produce the application's resins, RJ-100 is preferred as it results in a somewhat lower viscosity than RJ-101.

In U.S. Pat. No. 3,929,701 to Hall et. al., SAA is employed in the production of a binder for printing inks. The Hall patent differs from the application in several ways. First, Hall teaches a binder which is used in ink films to hold the pigment to the printed surface. While the application's resins may be employed as binders, their primary purpose is to produce grind bases or pigment dispersions.

Also, in the Hall patent the binder is composed of SAA or a similar derivative, rosin material, and a modified drying oil (with castor oil or tung oil being preferred). The rosin and oil are reacted with fumaric acid, and subsequently esterified with the SAA. Thus, the only hydroxyl-containing compound in the Hall binders is the SAA. There is no mention or suggestion in the Hall patent of additionally esterifying the binder with any low molecular weight glycols or polyols.

The resins taught in the application differ from Hall's in that the application's resins do not contain a modified drying oil. Also, the use of a polyol is essential to obtain the high solids low viscosity grind base. Furthermore, a polyol (such as glycerol or pentaerythritol) may be used to improve the softening points of the resins for use in certain inks. The resins taught in the application are made by first fumarizing (or maleating) the rosin, and subsequently esterifying the rosin with a polyol (or combination of polyols). The SAA is added last to further esterify the rosin resin.

Polyols which are suitable for use in the reaction include, but are not limited to, the following:
glycerol,
sorbitol,
pentaerythritol,
neopentyl glycol,
ethylene glycol,
polyethylene glycols, and
combinations thereof.

Polyethylene glycols (and mixtures thereof) which are suitable for use in the reaction have an average molecular weight in the range of 100–5,000.

The process for producing the desired grinding resins comprises reacting in an esterification reaction from 70 to 96% by weight of fumarated rosin or maleated rosin (or a combination thereof), 2 to 20% by weight of styrene-allyl alcohol copolymer, and from 2 to 18% by weight of a polyol or combination of polyols.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A resin was produced using maleic anhydride to fortify the rosin via the following procedure. (All formulae and procedures are given in parts by weight of reactants.) Rosin SS (100 parts) was heated to 210°0 C. under a positive nitrogen pressure. (Rosin SS is a tall oil based rosin manufactured by Westvaco.) Maleic anhydride (24 parts) and pentaerythritol (5 parts) were added to the hot resin. The mixture was stirred at 210° C. for 1.5 hours. Styrene-allyl alcohol (SAA) copolymer (3 parts) was subsequently added in a single portion and the mixture stirred at 210° C. for four hours before cooling and collecting the resin.

The acid number of the resin was determined to be 226 by dissolving approximately 2g of the rosin-based resin in 25 ml toluene and 75 ml of methanol. Phenolphthalein was added and the solution titrated with 0.2715N KOH to the end point. This method was utilized to determine the acid number (where listed) in subsequent examples.

The softening point of the resin was measured to be 115–133° C. via the ring and ball method. This method was utilized to determine the softening points (where listed) in subsequent examples.

Thus, the example resin produced with maleic anhydride exhibited a good softening point and excellent stability (i.e., after a 30 day period no sediment formation was noted). Subsequent grind resins showed good color strength, although not quite as good as resins made with fumarized rosin.

EXAMPLE 2

A series of resins employing different polyols was produced using the following procedure. All formulae and procedures are given in parts by weight of reactants. Rosin SS (100 parts) was melted in a 1000 ml three-neck round bottom flask. The flask was equipped with a Dean Stark trap, condenser, nitrogen inlet, thermocouple, heating mantle, and heating tape. Fumaric acid (22 parts) was added to the molten rosin at 150° C., and this mixture was heated to 200° C. and stirred for three hours. At this point the fumarized rosin had an acid number of 340. The respective amount of the polyol to be evaluated was slowly added to the rosin (see Table I below) and the resulting mixture was stirred for one hour at 200° C. SAA (RJ-100, 12 parts) was added and the reaction continued at 210° C. for an additional three hours before cooling and collecting the resin.

The resulting rosin resins were formulated into varnishes (i.e., alkaline solutions of the resins). The components of the varnishes included the respective resins, water as a solvent, ammonia to neutralize the resin, isopropanol as a co-solvent, and a deformer. The typical varnish formulation was:

| | |
|---|---|
| 35.0 | Resin |
| 7.0 | Isopropanol |
| 6.0 | Ammonia |
| 0.2 | Foamblast 1005 |
| 51.8 | Water |
| 100.0% | |

Foamblast 1005 is a defoamer manufactured by Ross Chemical, Inc. The ammonia was used to adjust the pH of the varnishes to between 8.0 and 9.0.

TABLE I

| | Varnish pHs | |
|---|---|---|
| Polyol[1] Type | Polyol[2] Parts | Varnish pH |
| NPG | 14 | 8.9 |
| GLY | 11 | 8.7 |
| SBT | 14 | 8.5 |
| PE | 7 | 8.4 |

[1]NPG = neopentyl glycol
GLY = glycerine
SBT = sorbitol
PE = pentaerythritol.
[2]Parts by weight of polyol per 100 parts of rosin.

Grind bases of pigment dispersions were prepared from the varnishes. Copper phthalocyanine blue press cake (manufactured by Sun Chemical Company) consisting of 50% pigment in water was used in this series of experiments. The typical grind resin formulation was:

| | |
|---|---|
| 49.5 | Varnish |
| 50.0 | Press cake |
| 0.5 | Foamblast 1005 |
| 100.0% | |

The resin in the varnish served to disperse the pigment during the grinding process and to prevent the pigment particles from reagglomerating and settling. The grinding process insolved predispersing the varnish and press cake in a Waring blender prior to grinding in a quicky mill. The respective grind bases were let down into inks by following the following formulations:

| | |
|---|---|
| 50 | Grind base |
| 32 | JONCRYL J-87 |
| 10 | Water |
| 3 | Isopropanol |
| 5 | JONWAX 26 |
| 100% | |

Both JONCRYL J-87 (an acrylic resin) and JONWAX 26 (a polyethylene wax emulsion) are manufactured by S.C. Johnson & Sons, Inc. The resulting inks are evaluated in Table II below.

TABLE II

Ink Viscosities of Resins Modified with SAA and a Polyol

| Polyol[1] Type | Polyol[2] Parts | Acid Number | Softening Point °C. | Zahn #2 Viscosity (Sec.) | | | |
|---|---|---|---|---|---|---|---|
| | | | | Day 1 | Day 4 | Day 14 | Day 50 |
| NPG | 14 | 171 | 128 | 24 | 26 | 31 | 38 |
| GLY | 11 | 159 | 140 | 27 | 27 | 29 | 31 |
| SBT | 14 | 171 | 130 | 25 | 26 | 29 | 32 |
| PE | 7 | 186 | 141 | 30 | 32 | 39 | 46 |

[1]NPG = neopentyl glycol
GLY = glycerine
SBT = sorbitol
PE = pentaerythritol.
[2]Parts by weight of polyol per 100 parts of rosin.

As the above results indicate, the resins prepared with the different polyols and SAA each exhibited good softening points and produced relatively stable, low viscosity, high solids inks. The preferred resin prepared with glycerol displayed the best stability.

EXAMPLE 3

A series of evaluations were performed between FILTREZ 5014, UNIREZ 7098, and a preferred embodiment of the invention grinding resin. All formulae and procedures are given in parts by weight of reactants.

A preferred grinding resin for use in preparing water-based printing inks is produced via the following procedure. Rosin SS (500 gm, 100 parts) was melted in a 1000 ml three-neck round-bottom flask. This flask was equipped with a Dean-Stark trap, condenser, nitrogen inlet, thermocouple, heating mantle and heating tape. Fumaric acid (130 gm, 26 parts) was added to the molten rosin at 150° C., and this mixture heated to 200° C. and stirred for three hours. At this point the fumarized rosin has an acid number of 340. A mixture of (7 parts) triethylene glycol and (4 parts) glycerine weighing 500 g was added slowly to the rosin and stirred for one hour at 200° C. SAA was added (RM-100, 90 gm, 18 parts), and the reaction was continued at 210° C. for an additional three hours before cooling and collecting the resin. The resulting resin is hereafter referred to as GR-1.

Employing GR-1, FILTREZ 5014, and UNIREZ 7098 as the resins, a series of varnishes, grind resins, and inks were produced via the methods and formulations outlined in Example 2.

Comparisons were run between the products, and the results are listed in the tables below.

TABLE III

Acid Number and Softening Point

| Resin[1] | Acid Number | Softening Point |
|---|---|---|
| 5014 | 170 | 141° C. |
| 7098 | 177 | 130° C. |
| GR-1 | 175 | 135° C. |

[1]5014 = FILTREZ 5014, an alkali-soluble grinding resin manufactured by Filtered Rosin Products.
7098 = UNIREZ 7098, an alkali-soluble grinding resin manufactured by Union Camp Corporation.

TABLE IV

Varnish and Grind Base Viscosity

| Resin | pH | Varnish[1] Viscosity (cps) | Grind Base (sec.) Zahn #4 Viscosity | | | |
|---|---|---|---|---|---|---|
| | | | Day 1 | 7 | 12 | 25 |
| 5014 | 8.2 | 42250 | 59 | 50 | 233 | 129 |
| 5014 | 8.5 | 1258 | 29 | 33 | 37 | 23 |
| 5014 | 8.8 | 1145 | 14 | 15 | 17 | 14 |
| 7098 | 8.4 | 255 | 21 | 52 | 72 | Thick |
| 7098 | 8.6 | 170 | 13 | 12 | 11 | 11 |
| 7098 | 8.9 | 155 | 8 | 8 | 9 | 9 |
| GR-1 | 8.2 | 938 | 8 | 10 | 12 | 14 |
| GR-1 | 8.6 | 650 | 12 | 12 | 13 | 12 |
| GR-1 | 8.9 | 213 | 16 | 13 | 16 | 19 |

[1]Measured with a Brookfield LV viscometer equipped with a #1 spindle and set at speed 12. Due to its extreme viscosity, Resin 5014 (at pH 8.2) was measured at a speed setting of 0.6.

As the tables above note, the three resins have similar acid numbers and softening points. The viscosity of each varnish increased as the pH was lowered, with FILTREZ 5014 being the most sensitive to pH change while incorporated in a varnish and UNIREZ being the least sensitive. However., while FILTREZ 5014 and GR-1 produced precursor varnishes that were more viscous than UNIREZ 7098, all three of the resulting grind bases were similar in viscosity upon initial formation at similar pH (with the exception of 5014 at low pH levels).

Both UNIREZ 7098 and FILTREZ 5014 exhibited problems forming stable low viscosity, high solids grind bases at lower pH levels. Both of these resins produced stable grind bases at higher pH levels (i.e., from 8.7 to 8.9).

GR-1 exhibited the ability to form stable grind bases both at low and high pH levels.

EXAMPLE 4

A more preferred grinding resin for use in preparing water-based printing inks is produced via the following procedure, which is taught in parts by weight of reactants. Rosin SS (100 parts) was melted in a 1000 ml three-neck round-bottom flask. This flask was equipped with a Dean-Stark trap, condenser, nitrogen inlet, thermocouple, heating mantle and heating tape. Fumaric acid (26 parts) was added to the molten rosin at 150° C. and this mixture heated to 200° C. and stirred for three hours. The fumarized rosin has an acid number of 340. A mixture of (3.25 parts) diethylene glycol and (4.20 parts) glycerol was added slowly and stirred for one hour at 200° C. SAA was added (18 parts) and the reaction was continued at 210° C. for an additional three hours before cooling and collecting the resin. The resulting resin has an acid number of 179 and a softening point of 144° C.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A process for the production of grinding resins for water-based inks which comprises reacting:
   (a) 70 to 96% by weight of fumarated rosin or maleated rosin, or a combination thereof,
   (b) 2 to 20% by weight of styrene-allyl alcohol copolymer, and
   (c) 2 to 18% by weight of a polyol or combination of polyols.

2. The process of claim 1 which comprises reacting:
   (a) 79 to 90% by weight of fumarated rosin or maleated rosin, or a combination thereof,
   (b) 8 to 12% by weight of styrene-allyl alcohol copolymer, and
   (c) 2 to 12% by weight of a polyol or combination of polyols.

3. The process of claim 1 wherein the styrene-allyl alcohol copolymer has a molecular weight of 1000 to 3000.

4. The process of claim 1 wherein the polyol is selected from the group consisting of glycerol, sorbitol, pentaerythritol, neopentyl glycol, ethylene glycol, polyethylene glycols having an average molecular weight in the range of 100–5,000, and combinations thereof.

5. The grinding resin product of the process of claim 1.

6. The grinding resin product of the process of claim 2.

7. A grind base comprising the grinding resin product of claim 5 dispersed with ink pigments.

8. A grind base comprising the grinding resin product of claim 6 dispersed with ink pigments.

9. A water-based ink comprising the grind base of claim 7 let down in a binder resin emulsion.

10. A water-based ink comprising the grind base of claim 8 let down in a binder resin emulsion.

11. A process for the production of grinding resins for water-based inks which comprises reacting:
    (a) 70 to 96% by weight of fumarated rosin or maleated rosin, or a combination thereof,
    (b) 2 to 20% by weight of styrene-allyl alcohol copolymer,
    (c) 1 to 9% by weight of a polyol selected from the group consisting of glycerol, sorbitol, pentaerythritol, neopentyl glycol, ethylene glycol, and combinations thereof, and
    (d) 1 to 9% by weight of a polyethylene glycol or mixture of polyethylene glycols having an average molecular weight in the range of 100–5,000.

12. The process of claim 11 wherein the styrene-allyl alcohol copolymer has a molecular weight of 1000 to 3000.

13. The grinding resin product of the process of claim 11.

14. A grind base comprising the grinding resin of claim 13 dispersed with ink pigments.

15. A water-based ink comprising the grind base of claim 14 let down in a binder resin emulsion.

* * * * *

UNITED STATES PATENT AND TRADEMARK OFFICE
CERTIFICATE OF CORRECTION

PATENT NO. : 5,166,245                     Page 1 of 2
DATED      : November 24, 1992
INVENTOR(S): Paul J. Zuraw It is certified that error appears in the above-indentified patent and that said Letters Patent is hereby corrected as shown below:

In column 3, line 60, delete "210·0C" and substitute therefor --210·C--.

In column 4, line 41, delete "deformer" and substitute therefor --defoamer--.

In column 5, line 66, delete "of" and substitute therefore --or--.

In column 6, line 35, after Table IV, insert

-- TABLE V

Ink Viscosity

| Resin | Varnish pH | Grind Base Zahn #3 (sec) | Ink Zahn #2 (sec) | | | | |
|---|---|---|---|---|---|---|---|
| | | | Day 1 | Day 7 | Day 14 | Day 21 | Day 28 |
| 5014 | 8.4 | 21 | 22 | 23 | 24 | 24 | 25 |
| 7098 | 8.4 | 26 | 24 | 28 | 29 | 30 | 31 |
| GR-1 | 8.4 | 19 | 21 | 23 | 25 | 25 | 25 |

--.

UNITED STATES PATENT AND TRADEMARK OFFICE
CERTIFICATE OF CORRECTION

PATENT NO. : 5,166,245
DATED : November 24, 1992
INVENTOR(S) : Paul J. Zuraw

It is certified that error appears in the above-indentified patent and that said Letters Patent is hereby corrected as shown below:

In column 6, line 40, after UNIREZ insert --7098--.

In column 6, line 41, after However delete ",".

In column 8, line 31, after resin insert --product--.

Signed and Sealed this

Fifth Day of October, 1993

Attest:

BRUCE LEHMAN

*Attesting Officer*     Commissioner of Patents and Trademarks